United States Patent
Nakashio

(10) Patent No.: US 9,159,001 B2
(45) Date of Patent: Oct. 13, 2015

(54) DEVICE, METHOD, AND RECORDING MEDIUM FOR CONTROLLING IMAGE FORMING APPARATUS

(71) Applicant: CANON KABUSHIKI KAISHA, Tokyo (JP)

(72) Inventor: Hidekazu Nakashio, Warabi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/253,308

(22) Filed: Apr. 15, 2014

(65) Prior Publication Data

US 2014/0313529 A1    Oct. 23, 2014

(30) Foreign Application Priority Data

Apr. 22, 2013 (JP) .................................. 2013-089773

(51) Int. Cl.
  *H04N 1/60* (2006.01)
  *G06K 15/02* (2006.01)
  *G06F 15/00* (2006.01)

(52) U.S. Cl.
  CPC .................................. *G06K 15/027* (2013.01)

(58) Field of Classification Search
  USPC ......... 358/1.9, 500, 1.1, 400, 909.1; 435/6.12
  See application file for complete search history.

(56) References Cited

U.S. PATENT DOCUMENTS

| 8,705,122 B2 | 4/2014 | Matsuzaki |
| 2005/0088672 A1* | 4/2005 | Johnson ........................ 358/1.9 |
| 2007/0182996 A1* | 8/2007 | Nakajima ..................... 358/3.13 |
| 2011/0299102 A1* | 12/2011 | Matsuzaki ..................... 358/1.9 |

FOREIGN PATENT DOCUMENTS

| JP | 2006-165864 | 6/2006 |
| JP | 2011-22231 | 2/2011 |
| JP | 2011-254350 | 12/2011 |

* cited by examiner

*Primary Examiner* — Quang N Vo
(74) *Attorney, Agent, or Firm* — Fitzpatrick, Cella, Harper & Scinto

(57) ABSTRACT

In the case where a request for printing is mage during execution of a continuous calibration, it is possible to interrupt a job without impairing the quality of printing by performing printing after executing an effective calibration in accordance with the kind of job, however, there is no mechanism to cancel each calibration in the standby state, and in order to make cancellation, it is necessary to wait until execution of each calibration is started, and therefore, the printing chances are lessened. There is provided a mechanism to display kinds of jobs in which printing is recommended at the point of time of end of each calibration and to enable cancellation of the calibration function of calibrations other than effective calibration after the effective calibration is executed.

15 Claims, 15 Drawing Sheets

FIG.7A

| NUMBER | KIND OF CALIBRATION | JOB IN WHICH PRINTING IS RECOMMENDED | |
|---|---|---|---|
| N = 1 | MAXIMUM DENSITY CORRECTION | DOCUMENT MAINLY INCLUDING CHARACTERS SUCH AS TABULAR SHEET | |
| N = 2 | SINGLE COLOR CORRECTION FOR COPY | MONOCHROME, COLOR COPY FOR WHICH COLOR TONE IS NOT IMPORTANT | SINGLE COLOR CALIBRATION |
| N = 3 | SINGLE COLOR CORRECTION FOR ERROR DIFFUSION | MONOCHROME, COLOR PRINT FOR WHICH COLOR TONE IS NOT IMPORTANT | |
| N = 4 | SINGLE COLOR CORRECTION FOR LOW LINE NUMBER | | |
| N = 5 | SINGLE COLOR CORRECTION FOR HIGH LINE NUMBER | | |
| N = 6 | MULTI COLOR CORRECTION | GENERAL DATA FOR WHICH COLOR TONE IS IMPORTANT | MULTI COLOR CALIBRATION |

FIG.7B

| NUMBER | KIND OF CALIBRATION | JOB IN WHICH PRINTING IS RECOMMENDED |
|---|---|---|
| N = 1 | MAXIMUM DENSITY CORRECTION | DOCUMENT MAINLY INCLUDING CHARACTERS SUCH AS TABULAR SHEET |
| N = 4 | SINGLE COLOR CORRECTION OR LOW LINE NUMBER | MONOCHROME, COLOR PRINT FOR WHICH COLOR TONE IS NOT IMPORTANT |
| N = 5 | SINGLE COLOR CORRECTION FOR HIGH LINE NUMBER | |
| N = 6 | MULTI COLOR CORRECTION | GENERAL DATA FOR WHICH COLOR TONE IS IMPORTANT |

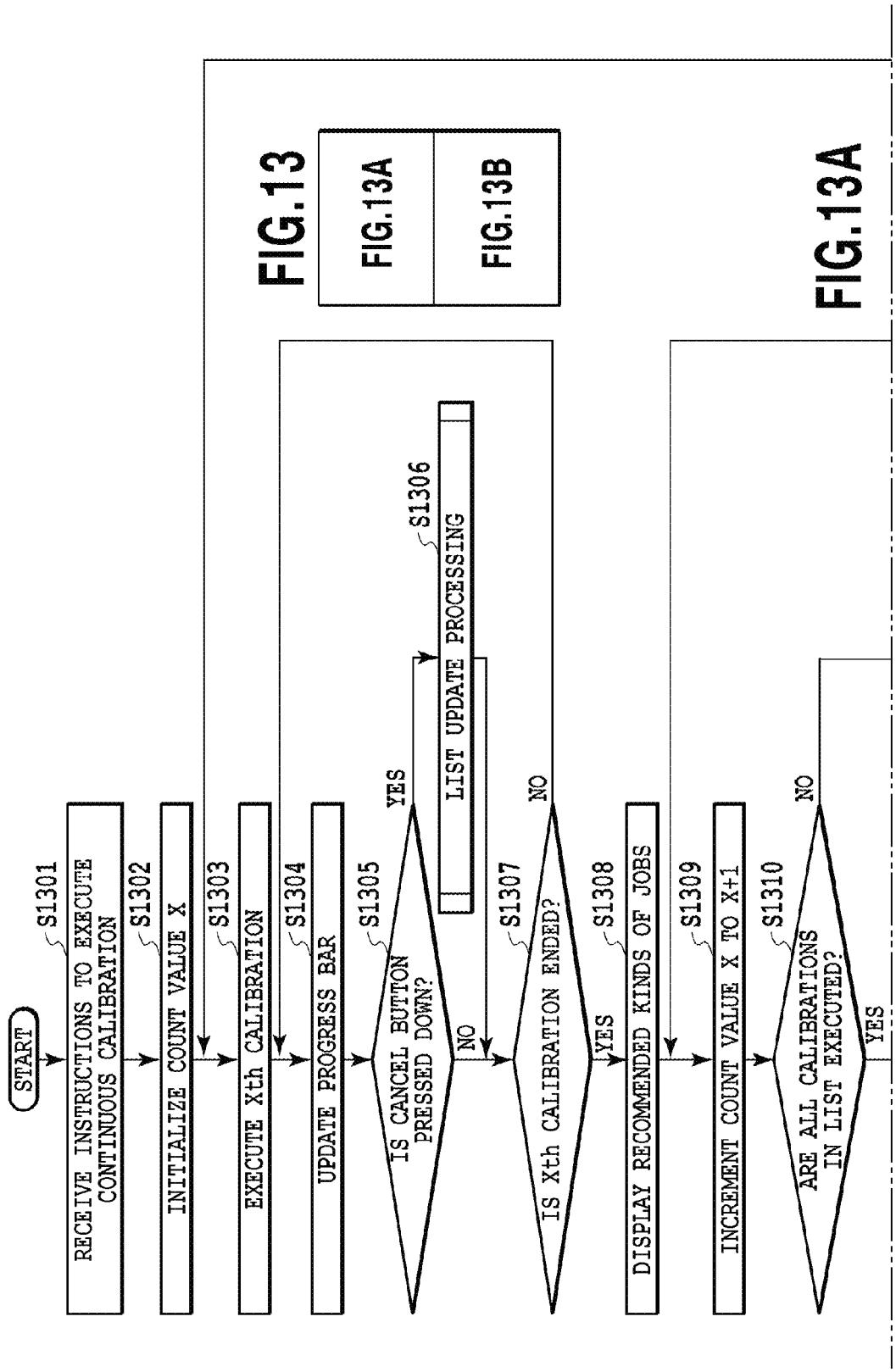

| DATE OF REGISTRATION | ENVIRONMENT | NUMBER OF OUTPUT SHEETS (COUNT VALUE) |
|---|---|---|
| 2012/03/21 9:34 | STANDARD TEMPERATURE / STANDARD HUMIDITY | 1970 |
| 2012/03/20 8:45 | STANDARD TEMPERATURE / STANDARD HUMIDITY | 1360 |
| ... | ... | ... |

FIG.14

DEVICE, METHOD, AND RECORDING MEDIUM FOR CONTROLLING IMAGE FORMING APPARATUS

BACKGROUND OF THE INVENTION

1. Field of the Invention

The present invention relates to a control technique at the time of executing a plurality of calibrations together in an image forming apparatus.

2. Description of the Related Art

In recent years, accompanying the trend of computerization, the need to output a document and an image in color is spreading and printers of various kinds of systems are put on the market. The systems for forming a color image include the sublimation system, the thermal transfer system, the inkjet system, etc., however, from the viewpoint of forming an image quickly, the electrophotographic system is said to be the most excellent.

However, the image forming apparatus of electrophotographic system has such a problem that the density of an image varies considerably depending on the use environment (temperature and humidity), the variation in the characteristics of photoreceptor and developer, and the durability state of the developing equipment etc. In particular, the color image forming apparatus has such a problem that the color tone also changes.

To address these problems, a calibration using a one-dimensional LUT (Look Up Table) for density correction corresponding to the "single color" of cyan, magenta, yellow, and black (hereinafter, described as C, M, Y, and K) is executed conventionally. The LUT is a table indicating output data corresponding to input data separated into specified intervals and enables representation of nonlinear characteristics that cannot be expressed by an arithmetic operation expression. The one-dimensional LUT for density correction includes printer-side output signal values capable of representing the input signal value of each of CMYK and an image is formed on a sheet using the toner corresponding to the output signal value. First, a chart including data at different densities corresponding to the toner of each of CMYK is prepared and output in a printer unit. Then, by reading the value of the output chart with a scanner or colorimeter and by comparing the read value with the target value data possessed in advance, the one-dimensional LUT for density correction for each of CMYK independently of one another. Hereinafter, the calibration for each color independent of one another is called the "single color calibration".

However, even by adjusting the density characteristic of a single color by the one-dimensional LUT, a "multi color" causes a nonlinear difference depending on the printer, and therefore, it is difficult to guarantee the color tone. Here, the "multi color" is a color using toner of a plurality of colors, such as red, green, and blue using two colors of C, M, and Y, gray using C, M, and Y, etc. In particular, in the electrophotographic system, even by correcting the gradation characteristic of a single color by the one-dimensional LUT, in the case where a "multi color" is represented using toner of a plurality of colors, a nonlinear difference is caused frequently. Because of this, by executing a calibration, the color reproduction characteristic of a multi color represented by a combination (superimposition etc.) of toner of a plurality of colors is corrected. For example, the technique to correct a color difference of a multi color by focusing attention on the destination profile of the ICC profile and by modifying the profile has been proposed (see Japanese Patent Laid-Open No. 2006-165864). The ICC profile is the data specified by the ICC (International Color Consortium) and used at the time of color conversion. First, a chart created by a multi color is output by a printer and the chart is measured with a scanner or colorimeter. Then, a difference is created using the colorimetry result and the target value and a three-dimensional LUT (destination profile) for converting a device-independent color space ($L^*a^*b^*$) of the ICC profile into a device-dependent color space (CMYK) is updated. Due to this, it is made possible to correct the reproduction characteristic of a multi color. Hereinafter, the calibration for such a multi color is called the "multi color calibration". The $L^*a^*b^*$ is one of device-independent color spaces and $L^*$ represents luminance and $a^*b^*$ represent hue and saturation. Further, as the technique to correct the reproduction characteristic of a multi color, the calibration technique has also been proposed, in which a chart created by a multi color in the range that can be reproduced by a printer is output and the chart is measured with a scanner or colorimeter, and then, the measured value is compared with the target value and thus the correction value is created (see Japanese Patent Laid-Open No. 2011-254350).

Then, the calibrations the correction targets of which are different should be executed individually for each calibration, however, there are apparatuses equipped with the function to combine those calibrations and to execute the calibrations continuously. Hereinafter, the function to continuously execute a plurality of calibrations the correction targets of which are different is called the "continuous calibration function". Once such a continuous calibration is started, it is no longer possible to do a job accompanied by printing, and therefore, there is a possibility that the printing chances are lessened. To address this, it has been proposed to abort the calibration in the case where the accumulated number of printed sheets to which the number of sheets related to the printing of image data is added is less than a fixed number, and to continue the calibration in the case where the number is equal to or more than the fixed number (see Japanese Patent Laid-Open No. 2011-022231).

In the conventional mechanism, in the case where a request for printing is made, calibration processing being currently performed is aborted by giving instructions to cancel. Because of this, it is necessary to wait until the execution of a calibration is started in order to cancel the calibration.

SUMMARY OF THE INVENTION

The device according to the present invention is a device for controlling an image forming apparatus including a function to execute a first calibration and a second calibration different from the first calibration, and having an execution instruction unit configured to give instructions to continuously execute the first calibration and the second calibration and an abort instruction unit configured to give instructions to abort the execution of the calibration of the first calibration and the second calibration, the execution which is not started yet, after the instructions on the continuous execution by the execution instruction unit.

According to the present invention, it is made possible to give instructions to cancel a calibration even in the standby state, and therefore, it is no longer necessary for a user to wait until the execution of a calibration that the user desires to cancel is started. Due to this, the convenience of the user is improved.

Further features of the present invention will become apparent from the following description of exemplary embodiments (with reference to the attached drawings).

BRIEF DESCRIPTION OF THE DRAWINGS

FIGS. 7A and 7B are examples of a list for managing an execution order of each calibration executed continuously in a continuous calibration;

FIG. 13 is a diagram showing the relationship between FIGS. 13A and 13B. FIGS. 13A and 13B are flowcharts showing a flow of processing to resume an aborted continuous calibration or to execute the continuous calibration again by taking predetermined conditions into consideration after an interrupt printing ends in a third embodiment; and FIG. 14 is a diagram showing an example of history information.

DESCRIPTION OF THE EMBODIMENTS

Hereinafter, embodiments for embodying the present invention are explained using the drawings.

First Embodiment

Figure 1:
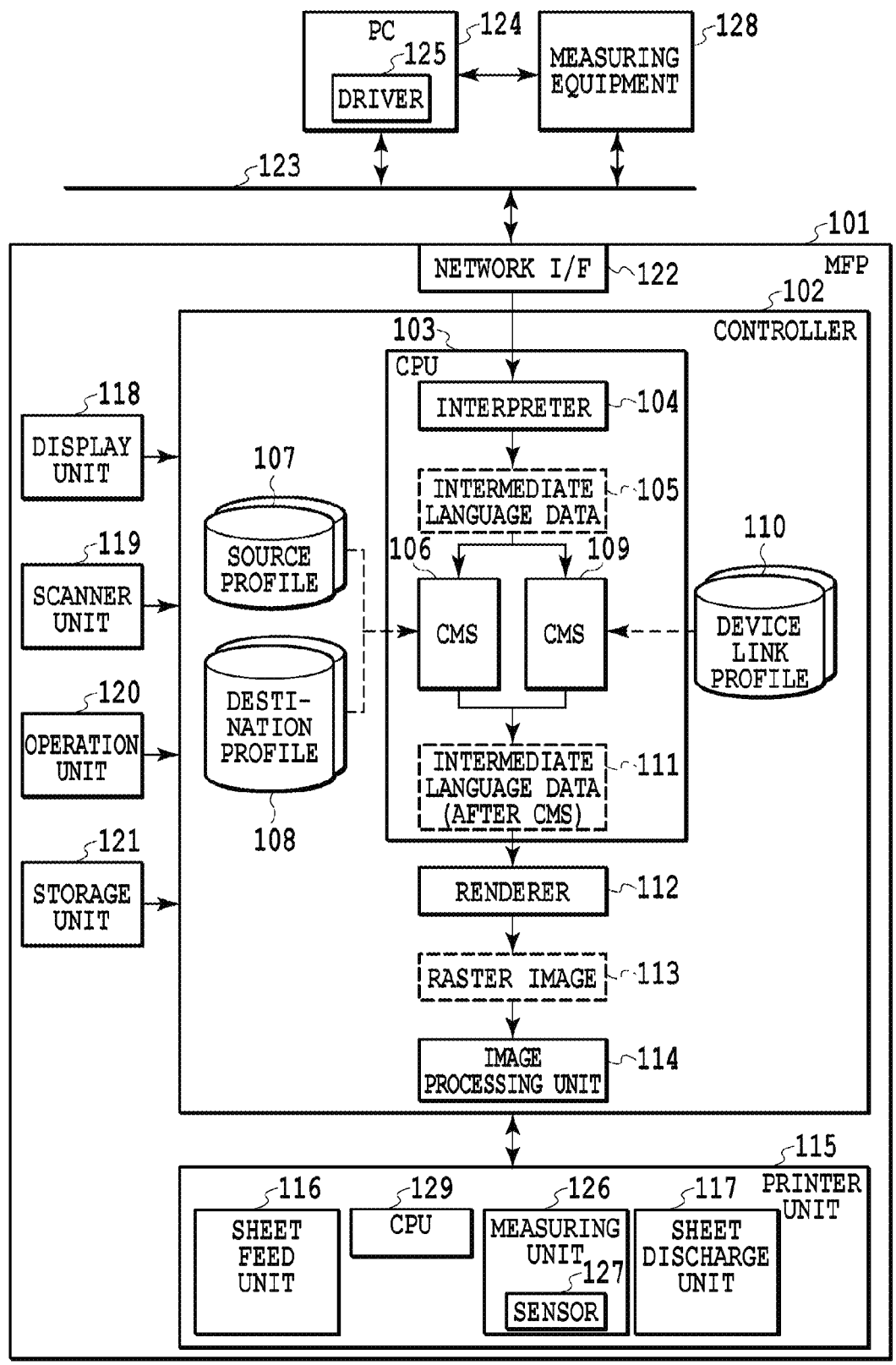
FIG. 1 is a diagram showing an example of a printing system configuration.

FIG. 1 is a configuration diagram of a printing system according to the present embodiment.

An image forming apparatus (MFP: Multi Function Printer) 101 of electrophotographic system using toner of each of CMYK is connected with another network compatible device via a network 123. A PC 124 is connected with the MFP 101 via the network 123. A printer driver 125 within the PC 124 transmits print data to the MFP 101.

The MFP 101 is explained in detail.

A network I/F 122 receives print data etc.

A controller 102 includes a CPU 103, a renderer 112, and an image processing unit 114. An interpreter 104 of the CPU 103 interprets the portion of PDL (Page Description Language) of the received print data and generates intermediate language data 105.

A CMS 106 carries out color conversion using a source profile 107 and a destination profile 108 and generates intermediate language data (after CMS) 111. The CMS is an abbreviation of Color Management System and carries out color conversion using information of a profile, to be described later. The source profile 107 is a profile for converting a device-dependent color space, such as RGB and CMYK, into a device-independent color space, such as L*a*b* and XYZ, specified by the CIE (Commission Internationale de l'Eclairage: International Commission on Illumination). The XYZ is a device-independent color space like the L*a*b* and a color is represented by three kinds of stimuli. The destination profile 108 is a profile for converting a device-independent color space into a CMYK color space dependent on a device (printer unit 115).

A CMS 109 carries out color conversion using a device link profile 110 and generates the intermediate language data (after CMS) 111. The device link profile 110 is a profile for directly converting a device-dependent color space, such as RGB and CMYK, into a CMYK color space dependent on a device (printer unit 115). Which CMS is selected depends on the setting in the printer driver 125.

In the present embodiment, according to the kinds of profiles (107, 108, and 110), the CMSs (106 and 109) are provided separately, however, it may also be possible to handle a plurality of kinds of profiles by one CMS. Further, the kinds of profiles are not limited to those described in the present embodiment and any kind of profile may be used as long as the device-dependent color space of the printer unit 115 is used.

The renderer 112 generates a raster image 113 from the generated intermediate language data (after CMS) 111.

The image processing unit 114 performs image processing on the raster image 113 or an image read by a scanner unit 119. Details of the image processing unit 114 will be described later.

The printer unit 115 is connected with the controller 102 and forms an image in accordance with output data on a recording medium, such as a recording sheet, using colored toner, such as CMYK. The printer unit 115 has a sheet feed unit 116 configured to feed a sheet, such as a recording sheet, a sheet discharge unit 117 configured to discharge a recording sheet on which an image is formed, and a measuring unit 126.

The measuring unit 126 includes a sensor 127 capable of acquiring the spectral reflectance and values of a device-independent color space, such as the L*a*b* and XYX, and is controlled by a CPU 129 that controls the printer unit 115. The measuring unit 126 reads an image formed on a sheet by the printer unit 115 with the sensor 127 and transmits the read numerical value information to the controller 102. The controller 102 performs an arithmetic operation using the numerical value information and utilizes in color correction of a single color and a multi color.

A display unit 118 displays various kinds of instructions to a user and the state of the MFP 101. It may also be possible to adopt the touch panel system and to integrate the display unit 118 with an operation unit 120 configured to receive an input from a user. The display unit 118 as a UI (User Interface) and the operation unit 120 are used at the time of giving instructions to execute the single color or multi color calibration, to be described later.

The scanner unit 119 irradiates images on documents in the form of a bundle or on one document with a light source, not shown, and forms the reflected image on a solid-state image capturing element, such as a CCD (Charge Coupled Device) sensor. Then, the scanner unit 119 receives an image read signal in the form of a raster from the solid-state image capturing element as image data. The scanner unit 119 includes an auto document feeder.

A storage unit 121 includes an HDD etc. and stores data having been subjected to processing in the controller 102, data received by the controller 102, etc.

The components of the MFP 101 are explained as above.

Measuring equipment 128 is connected onto the network 123 or the PC 124 and acquires the spectral reflectance and values of a device-independent color space, such as the L*a*b* and XYZ, as the measuring unit 126 described above does.

Next, details of the image processing unit 114 are explained.

Figure 2:
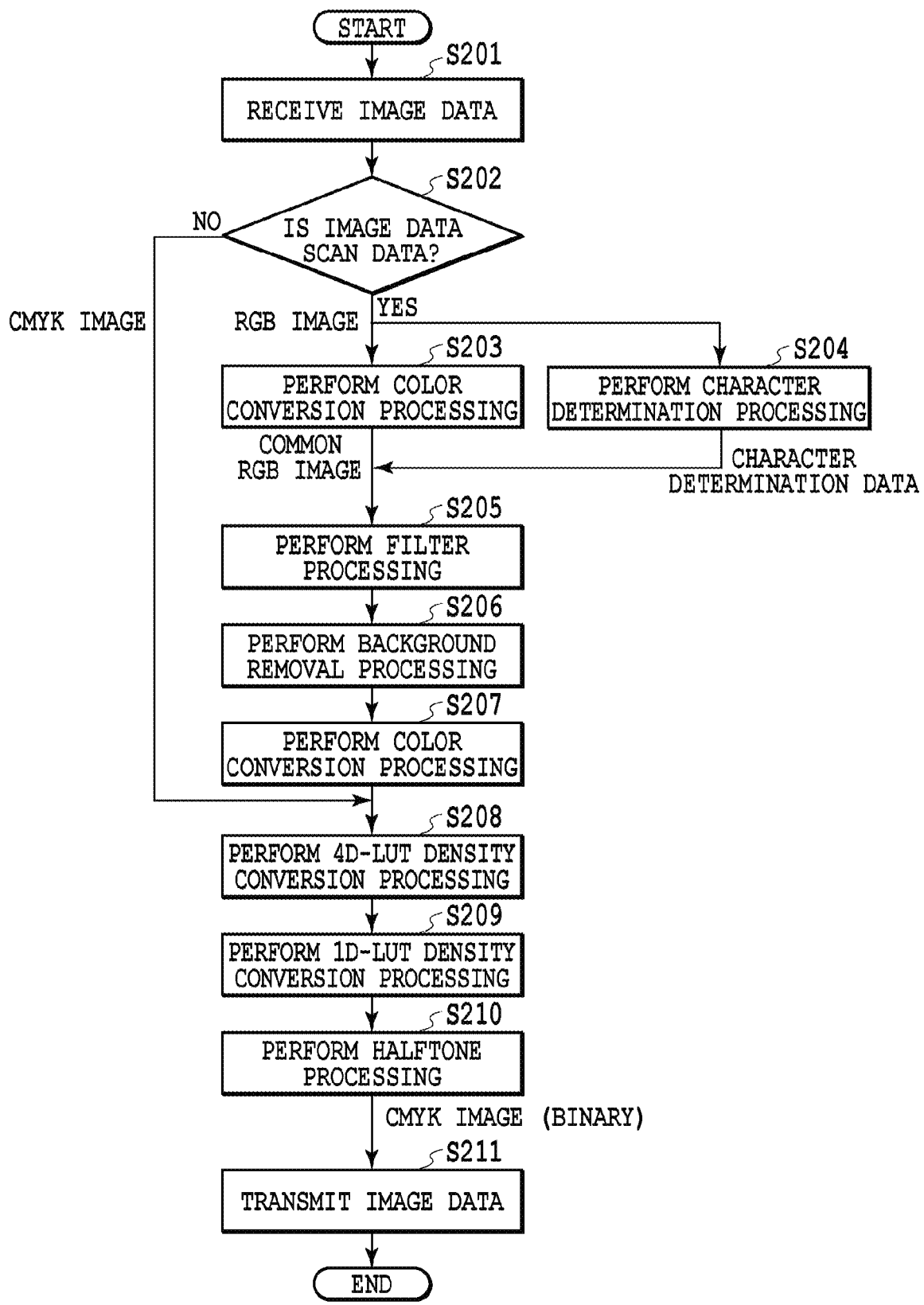
FIG. 2 is a flowchart showing a flow of various kinds of processing in an image processing unit.

FIG. 2 is a flowchart showing a flow of various kinds of processing in the image processing unit 114, and showing image processing performed on the raster image 113 and image data acquired by the scanner unit 119 in the chronological order. The series of processing is implemented by an ASIC (Application Specific Integrated Circuit), not shown, within the image processing unit 114 executing a computer-executable program in which the procedure shown below is described.

At step 201, the image processing unit 114 receives image data.

At step 202, the image processing unit 114 determines whether the received image data is the scan data received from the scanner unit 119. In the case where it is determined that the image data is the scan data, the image data is RGB image data, and therefore, the procedure proceeds to step 203 and step 204 for color conversion processing etc. On the other hand, in the case where it is determined that the image data is not the scan data, the image data is raster image data, that is, data of a CMYK image, which is an image developed into a bitmap image by the renderer 112 and then converted into CMYK dependent on a printer device by the CMS. In this case, the procedure proceeds to step 208.

At step 203, the image processing unit 114 generates a common RGB image by performing color conversion processing on the RGB image data. Here, the common RGB image refers to an image that is defined in the device-independent RGB color space and which can be converted into a device-independent color space, such as the L*a*b*, by an arithmetic operation.

At step 204, the image processing unit 114 performs character determination processing on the RGB image data and generates character determination data. Specifically, the image processing unit 114 extracts a character portion by detecting an edge etc. from the RGB image and generates character determination data in which the character portion can be identified.

At step 205, the image processing unit 114 performs filter processing on the common RGB image data generated at step 203 using the character determination data generated at step 204. Specifically, the image processing unit 114 separates the character portion from other portions using the character determination data and performs different filter processing on the character portion and other portions, respectively.

At step 206, the image processing unit 114 performs background removal processing on the common RGB image data having been subjected to the filter processing.

At step 207, the image processing unit 114 performs color conversion processing on the common RGB image data having been subjected to the background removal processing and generates a CMYK image the background of which is removed.

At step 208, the image processing unit 114 performs density conversion processing of a multi color using a 4D-LUT. Here, the 4D-LUT is a four-dimensional LUT for converting a combination of CMYK into a different combination of CMYK and is generated by "multi color calibration processing", to be described later. By using the 4D-LUT, it is made possible to correct the reproduction characteristic of a color represented by a "multi color", which is a color using tone of a plurality of colors.

At step 209, the image processing unit 114 performs density conversion processing of each single color of CMYK using a 1D-LUT. Here, the 1D-LUT is a one-dimensional LUT for correcting the gradation characteristic of each color of CMYK and is generated by "single color calibration processing", to be described later.

At step 210, the image processing unit 114 performs halftone processing, such as screen processing and error diffusion processing, and generates a CMYK image (binary).

At step 211, the image processing unit 114 transmits the image data having been subjected to the various kinds of processing to the printer unit 115.

The above is the flow of the processing in the image processing unit 114.

Next, "single color calibration processing" is explained.

Figure 3:
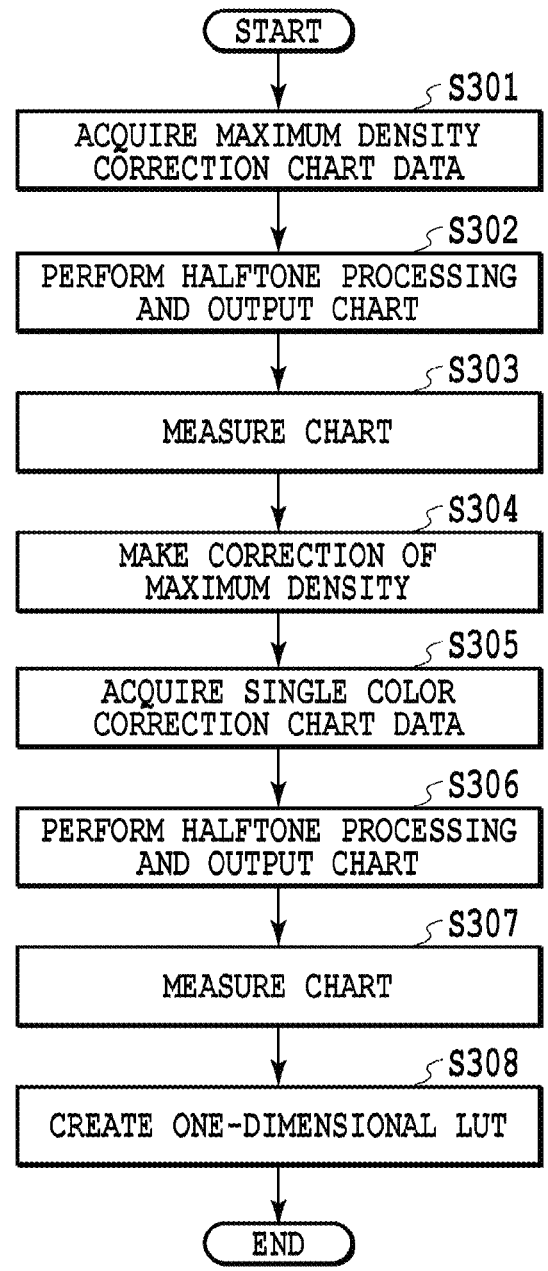
FIG. 3 is a flowchart showing a flow of processing to create a 1D-LUT for correcting the gradation of a single color.

FIG. 3 is a flowchart showing a flow of the processing to create the 1D-LUT for correcting the gradation of a single color. The series of processing is implemented by the CPU 103 within the controller 102 executing a computer-executable program in which the procedure shown below is described. The created 1D-LUT is stored in the storage unit 121.

Figure 4A:
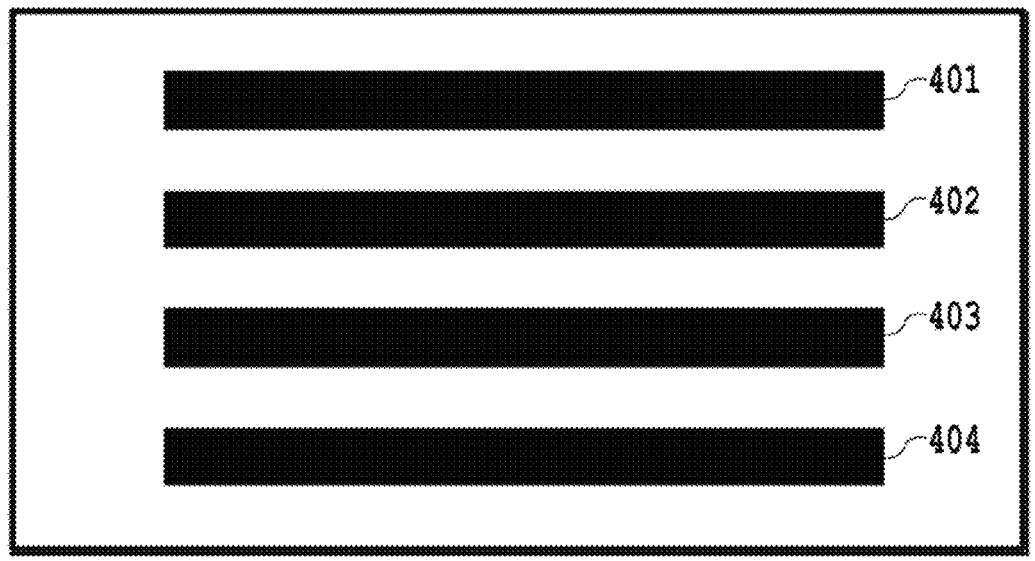
FIG. 4A is a diagram showing an example of maximum density correction chart data and FIG. 4B is a diagram showing an example of single color correction chart data.

At step 301, the CPU 103 acquires chart data for correcting the maximum density (hereinafter, referred to as "maximum density correction chart data") from the storage unit 121. The maximum density correction chart data includes signal values by which the maximum density of each color of CMYK is obtained. FIG. 4A is a diagram showing an example of the maximum density correction chart data and patches 401 to 404 are each formed at the maximum density of each color of CMYK.

At step 302, the CPU 103 instructs the image processing unit 114 to perform halftone processing on the maximum density correction chart data. The maximum density correction chart data having been subjected to the halftone processing in the image processing unit 114 is sent to the printer unit 115 and output as a maximum density correction chart.

At step 303, the CPU 103 measures the output maximum density correction chart using the scanner unit 119 or the sensor 127 within the measuring unit 126 and obtains the maximum density correction measurement values. The obtained measurement values are each the density value indicating the maximum density of each color of CMYK.

At step 304, the CPU 103 corrects the maximum density using the maximum density correction measurement value obtained at step 303 and a predetermined target value. Specifically, the CPU 103 adjusts the device setting values of the printer unit 115 so that the maximum density becomes the target value.

Figure 4B:
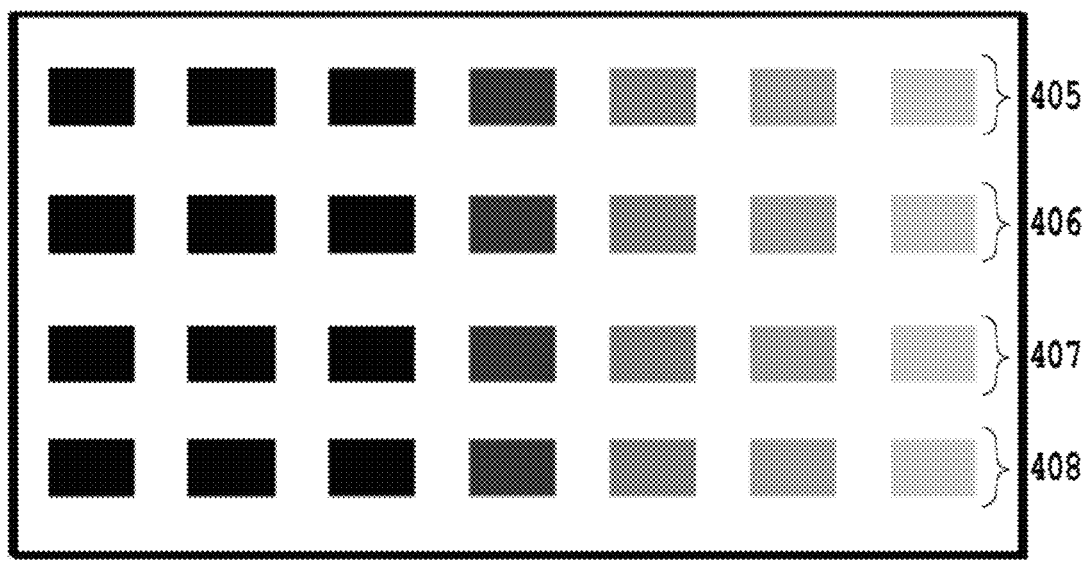

At step 305, the CPU 103 acquires chart data for correcting the gradation of each color of CMYK (hereinafter, referred to as "single color correction chart data") from the storage unit 121. The single color correction chart data includes signal values of gradation data of the "single color" of CMYK. FIG. 4B is a diagram showing an example of the single color correction chart data including patch groups 405 to 408 of each color of CMYK in which patches at densities different stepwise are placed side by side.

At step 306, the CPU 103 instructs the image processing unit 114 to perform halftone processing on the single color correction chart data. The single color correction chart data having been subjected to the halftone processing in the image processing unit 114 is sent to the printer unit 115 and output as a single color correction chart. The printer unit 115 is in the state of being capable of outputting a value of the maximum density equivalent to the target value due to step 304.

At step 307, the CPU 103 measures the output single color correction chart using the scanner unit 119 or the sensor 127 within the measuring unit 126 and obtains single color correction measurement values. The single color correction measurement values are each the density value obtained from the gradation of each color of CMYK.

At step 308, the CPU 103 creates the one-dimensional LUT for correcting the gradation of a single color using the single color correction measurement value and a predetermined target value.

In the manner as described above, the 1D-LUT used in the 1D-LUT density conversion processing described previously is created. The halftone processing method includes various kinds of method such as error diffusion method and dither method. According to the kind of halftone processing, the gradation characteristic differs between error diffusion method and dither method, and according to the kind of halftone processing, the color reproducibility also differs, and therefore, the correction LUT is necessary for each kind of halftone processing. That is, it is necessary to execute the calibration for all the kinds of halftone processing. Consequently, in the single color calibration, after correcting the maximum density at S304, the one-dimensional LUT is created in accordance with the kind of halftone processing at S308. For example, the one-dimensional LUT is created for each of the three kinds of halftone, that is, error diffusion, low line number dither, and high line number dither.

The maximum density correction and the correction of the single color reproduction characteristic by creating the one-dimensional LUT in accordance with each halftone are made during the execution of the single color calibration shown in FIG. 3.

The correction of the single color reproduction characteristic by creating the one-dimensional LUT in accordance with each halftone is handled as a calibration different from another because the different one-dimensional LUT is created.

Next, "multi color calibration processing" is explained. The calibration of a multi color corrects the reproduction characteristic (multi color characteristic) of a color represented by a multi color of a device after the single color calibration is executed. Because of this, it is desirable to execute the multi color calibration immediately after executing the single color calibration.

Figure 5:
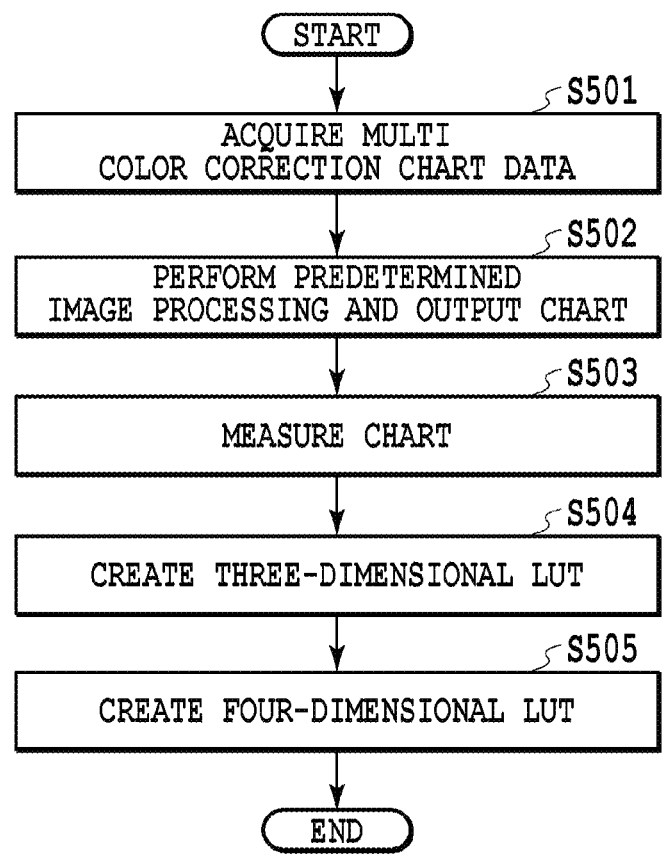
FIG. 5 is a flowchart showing a flow of processing to create a 4D-LUT for correcting a multi color.

FIG. 5 is a flowchart showing a flow of the processing to create the 4D-LUT for correcting the reproduction characteristic of a multi color. The series of processing is implemented by the CPU 103 within the controller 102 executing a computer-executable program in which the procedure shown below is described. The created 4D-LUT is stored in the storage unit 121.

Figure 6:
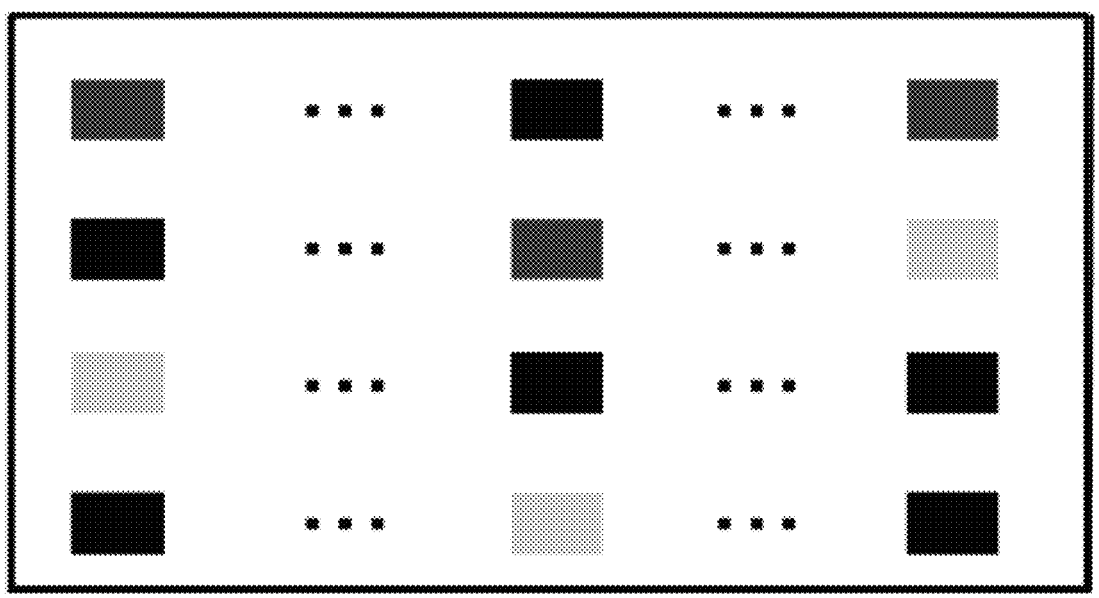
FIG. 6 is a diagram showing an example of multi color correction chart data.

At step 501, the CPU 103 acquires chart data for correcting the multi color reproduction characteristic (hereinafter, referred to as "multi color correction chart data") from the storage unit 121. The multi color correction chart data includes signal values of multi colors, which are combinations of CMYK. FIG. 6 is a diagram showing an example of the multi color correction chart data and all patches are formed by multi colors obtained by combining CMYK.

At step 502, the CPU 103 instructs the image processing unit 114 to perform image processing on the multi color correction chart data (1D-LUT density conversion processing and halftone processing). The multi color correction chart data having been subjected to the above-mentioned image processing in the image processing unit 114 is sent to the printer unit 115 and output as a multi color correction chart.

The multi color calibration is for correcting the reproduction characteristic of a multi color output from a device after the execution of the single color calibration, and therefore, in the above-mentioned 1D-LUT density conversion processing, the 1D-LUT created by the preceding single color calibration is used.

At step 503, the CPU 103 makes measurement of the output multi color correction chart using the scanner unit 119 or the sensor 127 within the measuring unit 126 and obtains multi color correction measurement values. The multi color correction measurement values indicate the multi color characteristic of the printer unit 115 after the execution of the single color calibration. Further, the multi color correction measurement values are values in a device-independent color space, and in the present embodiment, the color space is assumed to be the $L^*a^*b^*$. In the case where measurement is made using the scanner unit 119, it is assumed that the RGB value is converted into the $L^*a^*b^*$ value using a 3D-LUT etc., not shown.

At step 504, the CPU 103 acquires a 3D-LUT of $L^*a^*b^* \rightarrow CMY$ from the storage unit 121 and creates a 3D-LUT of $L^*a^*b^* \rightarrow CMY$ in which a difference between the multi color correction measurement value ($L^*a^*b^*$ value) and a predetermined target value ($L^*a^*b^*$ value) is reflected. Specifically, the above-described difference is added to the $L^*a^*b^*$ value on the input side and an arithmetic operation of interpolation is performed on the value in which the difference is reflected using the 3D-LUT of $L^*a^*b^* \rightarrow CMY$, and thus, a corrected 3D-LUT of $L^*a^*b^* \rightarrow CMY$ is created. Here, the 3D-LUT of $L^*a^*b^* \rightarrow CMY$ is a three-dimensional LUT that outputs CMY values corresponding to input $L^*a^*b^*$ values. At step 505, the CPU 103 acquires a 3D-LUT of $CMY \rightarrow L^*a^*b^*$ from the storage unit 121 and creates a 4D-LUT of $CMYK \rightarrow CMYK$. Specifically, first, from the 3D-LUT of $CMY \rightarrow L^*a^*b^*$ and the corrected 3D-LUT of $L^*a^*b^* \rightarrow CMY$, a 3D-LUT of $CMY \rightarrow CMY$ is created. Then, the 4D-LUT of $CMYK \rightarrow CMYK$ is created so that the input value and the output value of K are the same. Here, the 3D-LUT of $CMY \rightarrow L^*a^*b^*$ is a three-dimensional LUT that outputs $L^*a^*b^*$ values corresponding to input CMY values, and the 3D-LUT of $CMY \rightarrow CMY$ is a three-dimensional LUT that outputs CMY values after correction corresponding to input CMY values.

In this manner, the 4D-LUT used in the previously described 4D-LUT density conversion processing is created.

(Definition of continuous CAL)

Figure 9A:
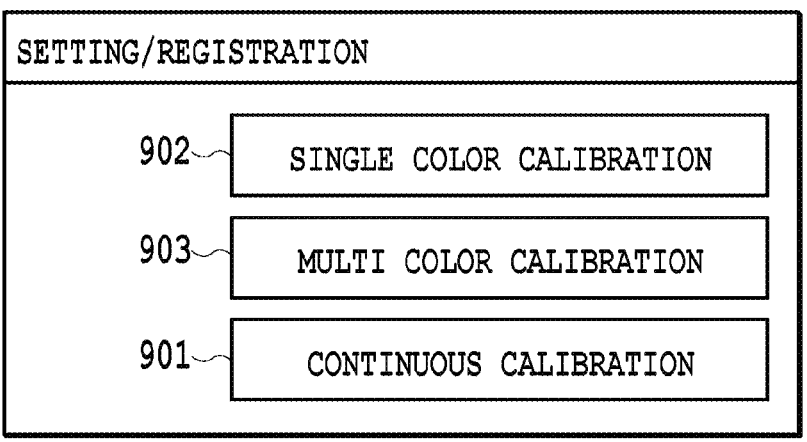
FIGS. 9A to 9C are diagrams showing an example of a UI screen for giving instructions to start a continuous calibration.

An example of the UI display at the time of selectively executing the single color calibration and the multi color calibration is shown in FIG. 9A. The UI screen in FIG. 9A is displayed on the display unit 118. Reference numeral 902 denotes a button to receive the start of the single color calibration and 903 denotes a button to receive the start of the multi color calibration. Further, 901 denotes a button to receive the start of the continuous calibration in which the multi color calibration is executed after the execution of the single color calibration. In the case where the button 901 is selected, the single color calibration is started and after the execution thereof, the multi color calibration is started.

Specifically, the multi color calibration is started by printing and outputting a chart image for the multi color calibration shown in FIG. 6 after the single color calibration ends. Alternatively, it may also be possible to display the button to start the multi color calibration on the UI screen for a user and to start the multi color calibration after the user presses down the button.

On the other hand, in the case where the button 902 is selected, only the single color calibration is executed. Similarly, in the case where the button 903 is selected, only the multi color calibration is executed.

The reason that the different buttons are used for the single color calibration and the multi color calibration is explained. At the time of printing and outputting a chart image (FIG. 6) used at the time of execution of the multi color calibration, the 1D-LUT created in the single color calibration is used. Consequently, it is desirable to correct the multi color reproduction characteristic by executing the multi color calibration immediately after the single color calibration, that is, immediately after the single color reproduction characteristic is corrected. However, in the case where both the two kinds of calibrations are executed, the processing time spent by a user for the calibrations is lengthened. Because of this, a user is caused to execute one of the single color calibration and the multi color calibration in accordance with the use environment of the user in order to shorten the processing time. Then, there occurs a state where the execution frequency differs between both the calibrations occurs. For example, the frequency of execution of the multi color calibration of a user who frequently performs single color printing is reduced. Further, the frequency of execution of the multi color calibration of a user who frequently performs color printing of a multi color, such as a photo, is increased. It may also be possible to control a timing at which a color correction menu can be selected.

Normally, the power source of an image processing apparatus is turned off at night and turned on in the morning in many cases. Because of this, the configuration is designed so that only the button 901 is allowed to be selected in the case where the main power source switch of the MFP 101 turns on and the power source is turned on. Alternatively, the configuration may be designed so that only the button 901 is allowed to be selected in the case where both the calibrations are not executed during a predetermined time. Alternatively, the configuration may be designed so that only the button 901 is allowed to be selected in the case where both the calibrations are not executed before printing is performed using a predetermined number of sheets.

Alternatively, in the case where a predetermined time elapses, where printing is performed using a predetermined number of sheets, or where the power source is turned on, the single color calibration and the multi color calibration may automatically be executed sequentially.

As described above, by allowing only the button 901 to be selected at the time of execution of calibration by a user with a predetermined timing, the user is prompt to execute the multi color calibration immediately after the execution of the single color calibration at each predetermined time.

Consequently, it is possible to select to execute both the calibrations by executing the multi color calibration after the execution of the single color calibration as described above, or to execute one of the single color calibration and the multi color calibration. Due to this, it is made possible to execute the calibration suitable to the use of a user.

Further, by performing control so that it is possible to select only to execute both the calibrations at each fixed time, it is made possible to suppress deterioration in correction accuracy of the reproduction characteristic by the calibration, which would be caused by the execution of only one of the calibrations.

The operation at the time of cancelling each calibration is explained, such as in the case where, for example, a request for printing (interrupt printing) is made after the above-mentioned continuous calibration is started.

FIGS. 7A and 7B are each an example of a list for managing the execution order of each calibration executed continuously in the continuous calibration. The continuous calibration shown in the list in FIG. 7 consists of six kinds of calibrations and the calibrations are executed in the increasing order of the number N attached to each calibration. The number N=1 corresponds to the calibration to correct the maximum density executed at steps 301 to 304 in the flowchart in FIG. 3 described previously. The numbers N=2 to 5 correspond to the single color calibration to correct a single color executed at steps 305 to 308. The single color calibration is classified into calibrations for copy (N=2), for error diffusion (N=3), for low line number (N=4), and for high line number (N=5) according to the kind of the halftone processing performed at step 306 and is executed for each halftone processing. Then, the number N=6 corresponds to the multi color calibration to correct the reproduction characteristic of a color represented by a multi color executed in the flowchart in FIG. 6 described previously.

Then, each calibration is associated with information on the kinds of jobs as "jobs in which printing is recommended", in which printing can be performed without impairing the quality of printing because the calibration is executed. Such a list for managing each calibration executed in the continuous calibration is stored in the storage unit 121 and is read and referred to at the time of utilizing the continuous calibration function. FIG. 7B will be described later.

Figure 8:
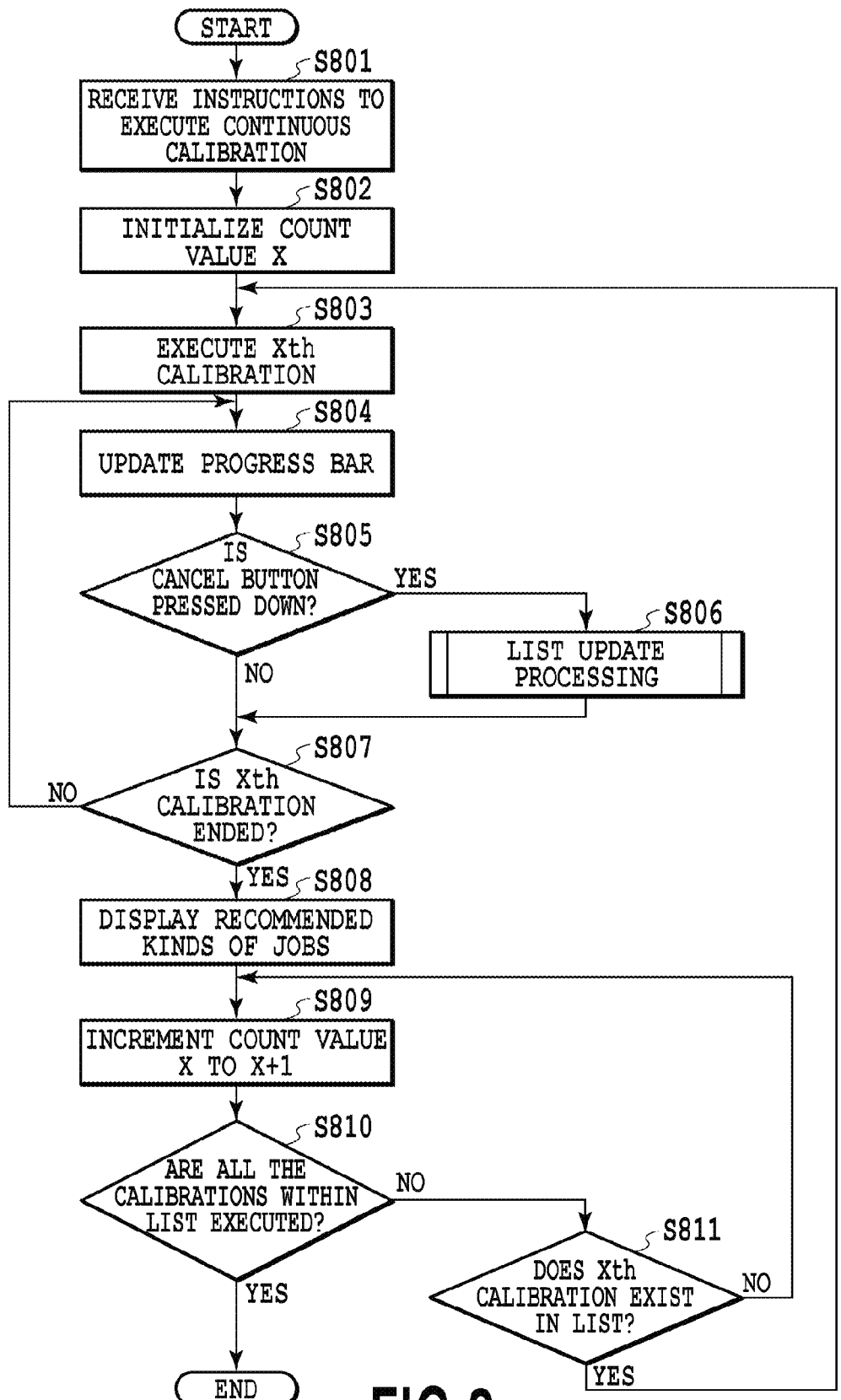
FIG. 8 is a flowchart showing a flow of processing to abort continuous execution of each calibration after a continuous calibration is started in a first embodiment.

FIG. 8 is a flowchart showing a flow of processing to abort continuous execution of each calibration after the continuous calibration is started in accordance with the above-described list in the present embodiment. The series of processing is implemented by the CPU 103 executing a computer-executable program in which the procedure shown below is described after reading the program on the RAM, not shown. In the present embodiment, explanation is given on the assumption that each processing to control the continuous calibration explained below is performed inside the image forming apparatus, however, the application range of the present invention is not limited to this. For example, in the case where the image forming apparatus and a PC etc. are connected via a network, such as a LAN, it may also be possible to design a configuration in which an information processing device, such as a PC, performs part of each processing described below and control is performed remotely.

Figure 9B:
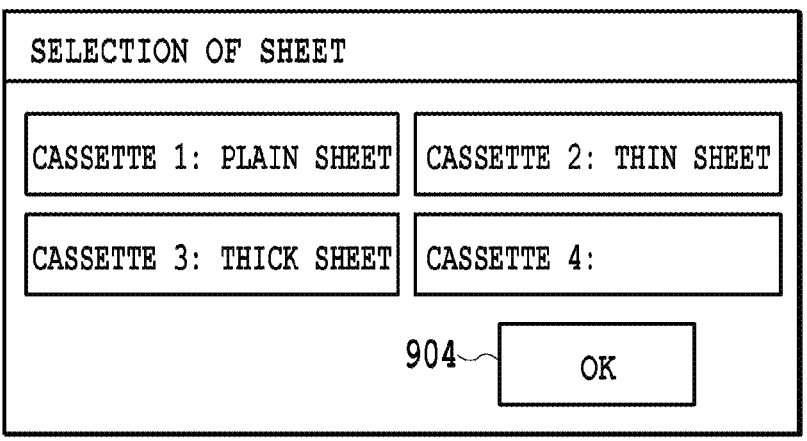
Figure 9C:
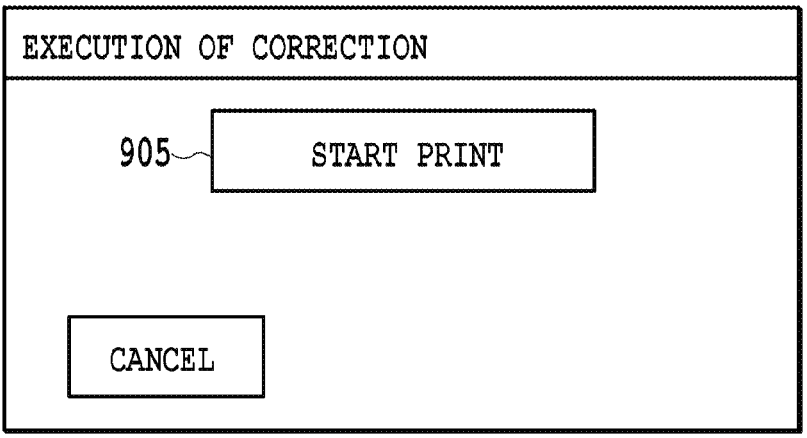

At step 801, the CPU 103 receives instructions to start the continuous calibration from a user via the operation unit 120. FIG. 9 is a diagram showing an example of the UI screen for a user to give instructions to start the continuous calibration. Such a UI screen is displayed on the display unit 118. On a calibration menu screen shown in FIG. 9A, the Continuous calibration button 901 is pressed down to start the continuous calibration. Next, the user selects the type of sheet (e.g., plain sheet in cassette 1) used in the continuous calibration on a Sheet selection screen shown in FIG. 9B and presses down the OK button 904. Then, by pressing down the Start print button 905 on a screen shown in FIG. 9C, the above-mentioned list is read from the storage unit 121 and the continuous calibration is started.

At step 802, the CPU 103 initializes a count value X (X=1).

At step 803, the CPU 103 refers to the list read from the storage unit 121 and executes the calibration with the number N corresponding to the count value X. For example, in the stage immediately after the start of processing, the count value X is 1, and therefore, the calibration of the maximum density correction with the number N=1 is executed as a result.

Figure 10:
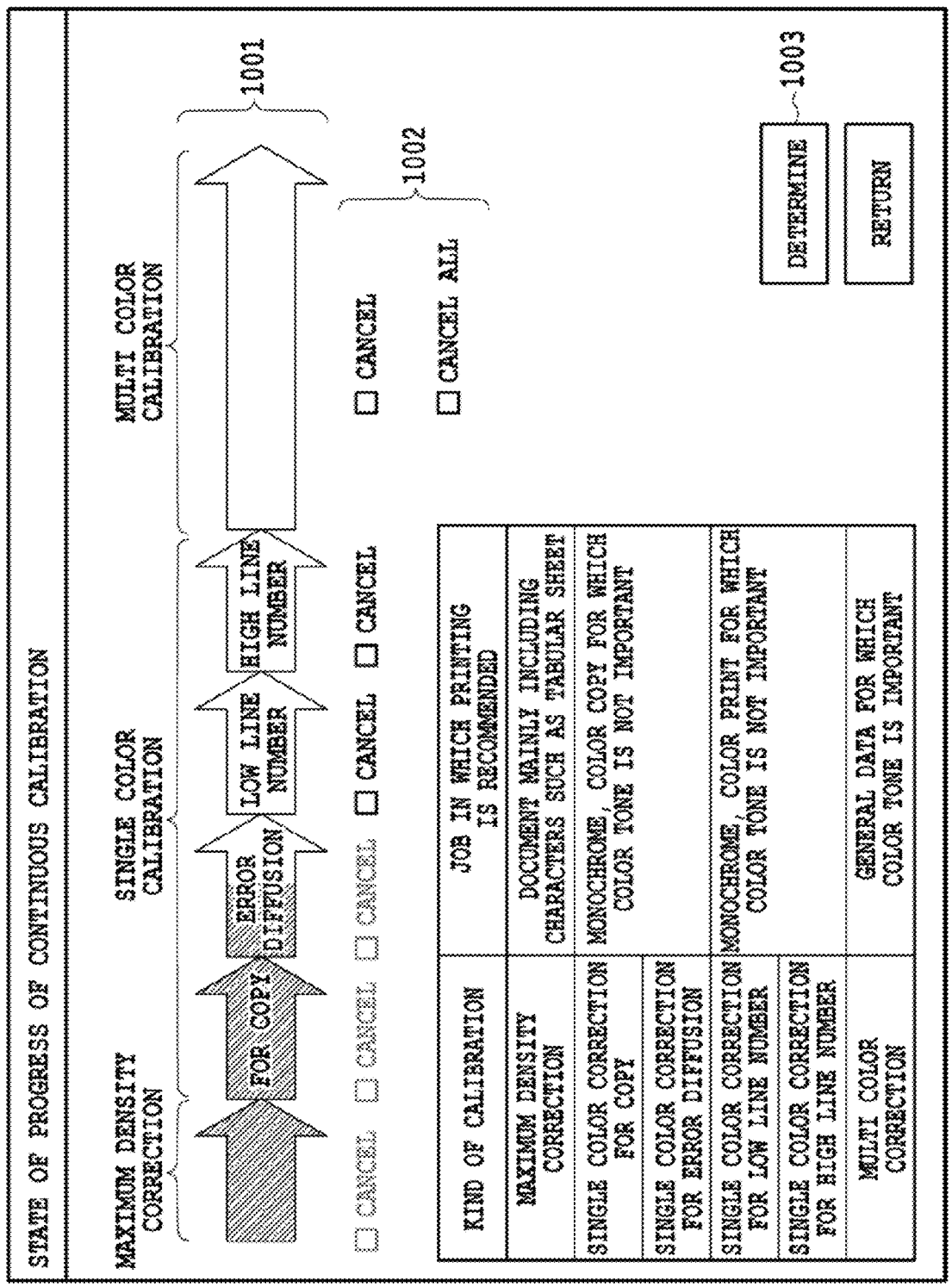
FIG. 10 is a diagram showing an example of a UI screen displaying the state of progress of a continuous calibration.

At step 804, the CPU 103 updates a progress bar within the UI screen indicating the state of progress of the continuous calibration in accordance with the state of processing of the calibration executed at step 803. FIG. 10 is a diagram showing an example of a UI screen indicating the state of progress of the continuous calibration, on which it is possible to give instructions to cancel the calibration in the standby state. In the example in FIG. 10, a progress bar 1001 within the UI screen indicating the state of progress of the continuous calibration indicates the state where the execution of the single color calibration for Error diffusion is on the way. Under the progress bar, checkboxes 1002 to give instructions to cancel each calibration are provided, respectively, and the user selects which calibration to cancel by taking into consideration the job scheduled to be done and presses down a Determine button 1003. As described above, in the present embodiment, it is also made possible to give instructions to cancel the calibration in the standby state, not executed yet, after the start of the continuous calibration. The calibration the processing of which is started is grayed out and brought into the state where the checkbox cannot be checked.

At step 805, the CPU 103 determines whether instructions to cancel a calibration are given by the above-described checkbox 1002 (whether checked). In the case where it is determined that instructions to cancel a calibration are given, the procedure proceeds to step 806. On the other hand, in the case where it is determined that instructions to cancel a calibration are not given, the procedure proceeds to step 807.

At step 806, the CPU 103 performs processing to update the list acquired at step 801. Specifically, the CPU 103 deletes the calibration for which instructions to cancel are given and the calibration(s) affected by the cancellation of the calibration from the list.

Figure 11:
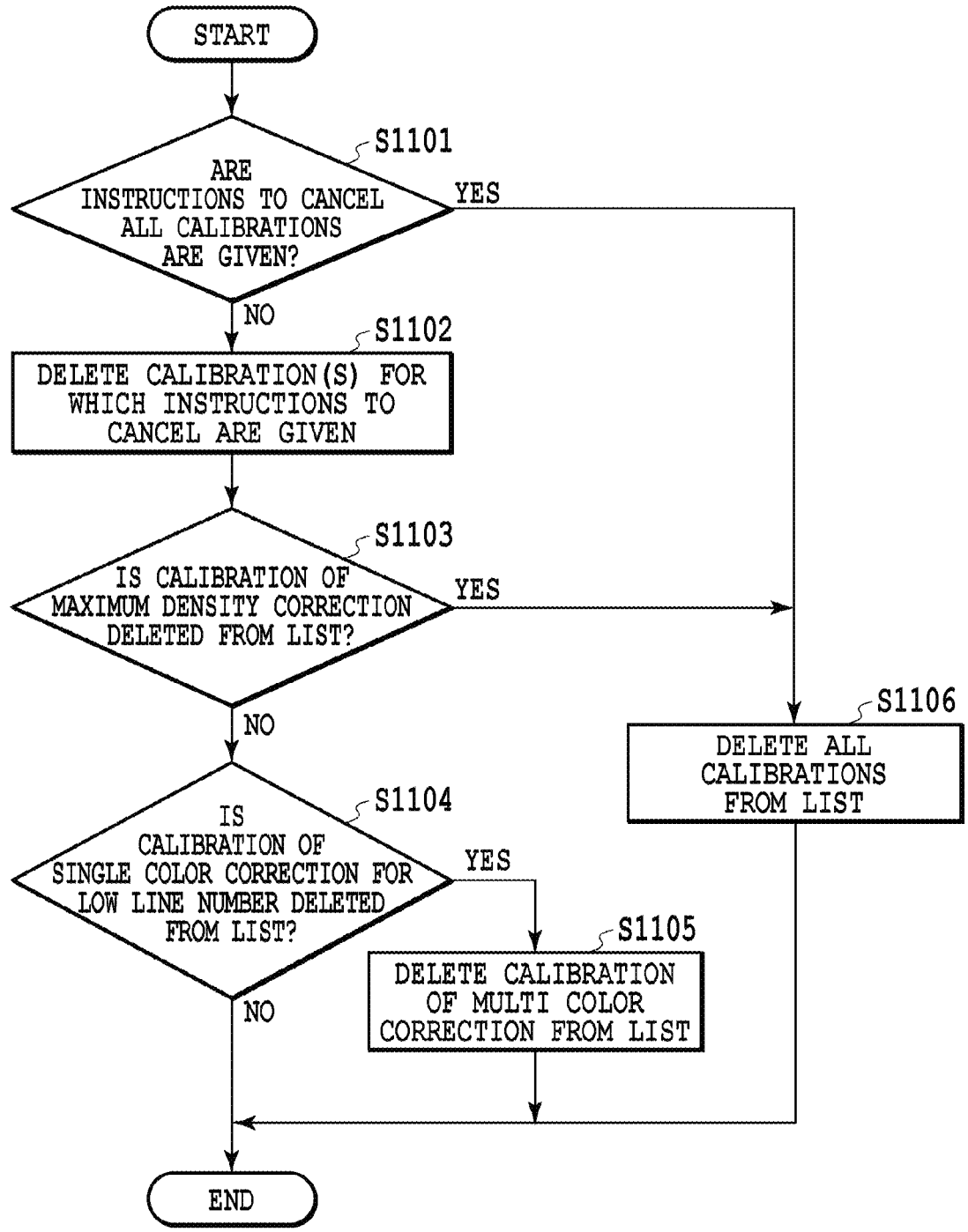
FIG. 11 is a flowchart showing a flow of list update processing.

FIG. 11 is a flowchart showing a flow of the list update processing.

At step 1101, the CPU 103 determines whether the contents of the instructions are those that all the calibrations be cancelled. In the case where instructions to cancel all the calibrations are given, the procedure proceeds to step 1106 and the CPU 103 deletes all the calibrations from the list. On the other hand, in the case where instructions to cancel all the calibrations are not given, the procedure proceeds to step 1102.

At step 1102, the CPU 103 updates the list by deleting the calibration(s) for which instructions to cancel are given from the list. FIG. 7B shows the list after the update in the case where instructions to cancel the single color calibrations for copy and error diffusion are given and it is known that the single color calibrations for copy and error diffusion are deleted from the original list (FIG. 7A).

At step 1103, the CPU 103 determines whether the calibration of the maximum density correction is deleted from the list at step 1102. In the case where the calibration of the maximum density correction is deleted, the procedure proceeds to step 1106 and the CPU 103 deletes all the subsequent calibrations that remain the list. The reason is that the single color calibration and the multi color calibration executed after the maximum density correction premise that the maximum density is corrected to the target value, and therefore, in the case where the maximum density correction is cancelled, the premise is not guaranteed. On the other hand, in the case where the calibration of the maximum density correction is not deleted from the list, the procedure proceeds to step 1104.

At step 1104, the CPU 103 determines whether the calibration of the low line number single color correction is deleted from the list. In the case where the single color calibration for low line number is deleted from the list, the procedure proceeds to step 1105 and the CPU 103 deletes the multi color calibration from the list. The reason is that the multi color calibration to correct the color reproducibility of a multi color premises that the single color gradation is corrected in the preceding single color calibration for low line number. On the other hand, in the case where the single color calibration for low line number is not deleted, the present processing is exited.

In the case where the determination result is "Yes" at steps 1103 and 1104, it may also be possible to display the contents of the subsequent calibrations to be cancelled accompanying the determination result on the display unit 118 to make notification to a user.

The above is the contents of the list update processing.

Explanation is returned to the flowchart in FIG. 8.

At step 807, the CPU 103 determines whether or not the Xth calibration the execution of which is started at step 803 is ended. In the case where the calibration is ended, the procedure proceeds to step 808. On the other hand, in the case where the calibration is not ended yet, the procedure returns to step 804.

At step 808, the CPU 103 displays the kinds of recommended jobs associated with the calibration on the display unit 118 after the calibration corresponding to the count value X ends. That is, the CPU 103 displays the kinds of jobs in which printing can be performed without impairing the quality of printing because the calibration is ended. As the display method, mention is made of a method in which the kinds of jobs are grayed out at the point of time before the calibration is not ended yet and are lit at the point of time of end of the calibration etc.

At step 809, the CPU 103 increments the count value X. Due to this, the next calibration managed in the list is executed.

At step 810, the CPU 103 determines whether the execution of all the calibrations within the list is completed. Specifically, the CPU 103 compares the current count value X and the maximum value of the number N in the current list and determines which is larger. In the case where the result of comparison demonstrates that the count value X is larger than the maximum value of the number N, the CPU 103 determines that the execution of all the calibrations is completed, and ends the present processing. On the other hand, in the case where the count value X is smaller than the maximum value of the number N or where the count value X and the maximum value of the number N are equal, the CPU 103 determines that there is a calibration not executed yet and the procedure proceeds to step 811.

At step 811, the CPU 103 determines whether the calibration corresponding to the current count value X exists within the list (whether X=N). In the case where the calibration corresponding to the current count value X exists within the list, the procedure returns to step 803 and the CPU 103 starts the execution of the calibration corresponding to the current count value X. On the other hand, in the case where the calibration corresponding to the current count value X does not exist within the list, the procedure returns to step 809 to move to the next calibration and the CPU 103 increments the count value X. The reason is that the calibration for which instructions to cancel are given is deleted from the list in the list update processing at step 806 and in this case the number N corresponding to the deleted calibration does not exist, and therefore, the count value X is incremented. For example, in the case where the list is updated to the list shown in FIG. 7B, the number N in the list after the update includes only 1, 4, 5, and 6, and 2 and 3 are not included. In this state, at step 809 immediately after the execution of the calibration of the maximum density correction ends, the count value X is incremented to 2, however, the number N corresponding to 2 does not exist. In such a case, the loop of steps 809 to 811 is performed twice (count value X is incremented twice) and then the calibration moves to the calibration of the low line number single color correction corresponding to the number N=4.

By the processing as described above, it is also possible to give instructions to cancel the calibration even in the standby state in the continuous calibration in any stage.

As explained above, according to the present embodiment, it is possible to give instructions to cancel the calibration in the standby state included in the continuous calibration. Due to this, for example, in the case where it is desired to perform interrupt printing after the continuous calibration in which a first calibration and a second calibration are executed continuously, it is possible to execute only the calibration(s) effective in the print job and to cancel the remaining calibration(s) in the standby mode. In this case, it is not necessary for a user to wait until the execution of the calibration in the standby state that the user desires to cancel is started, and therefore, the convenience of the user is improved.

Further, by displaying the kinds of jobs in which printing is recommended at the time of end of each calibration, it is possible for a user to easily grasp which job requires which calibration.

Second Embodiment

In the first embodiment, in the case where it is desired to perform interrupt printing after the continuous calibration is started, it is possible to cancel the subsequent calibration(s) after executing the calibration effective in the print job. Next, an aspect is explained as a second embodiment, in which after interrupt printing ends, the execution of the cancelled calibration(s) is resumed. Explanation of portions common to those of the first embodiment is omitted, and in the following, different points are explained mainly.

Figure 12:
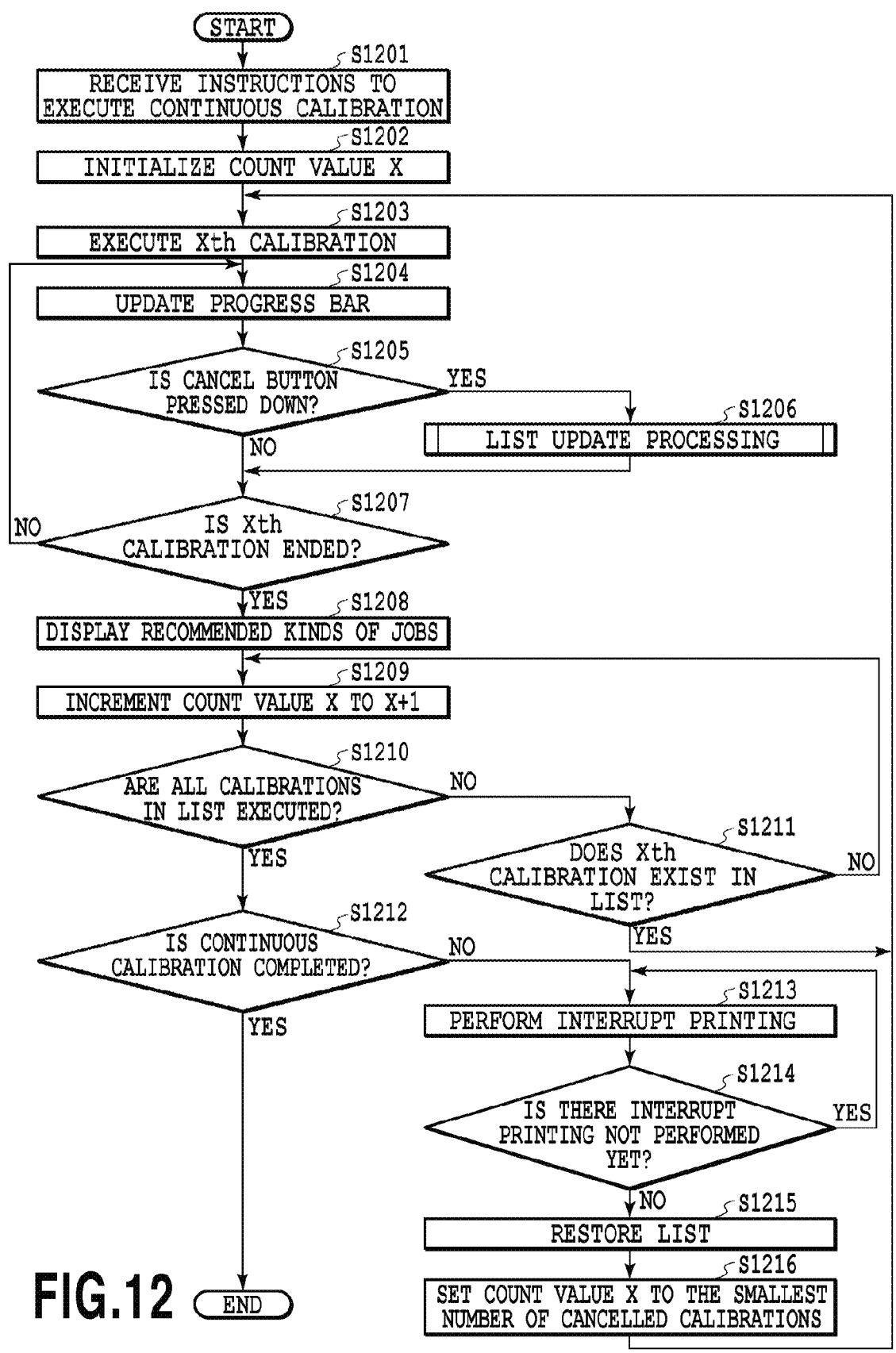
FIG. 12 is a flowchart showing a flow of processing capable of resuming execution of remaining calibrations cancelled in a continuous calibration after an interrupt printing ends in a second embodiment.

FIG. 12 is a flowchart showing a flow of processing capable of resuming the execution of the remaining calibration(s) cancelled in the continuous calibration after interrupt printing ends. The series of processing is implemented by the CPU 103 executing a computer-executable program in which the procedure shown below is described after reading the program on the RAM, not shown. As in the first embodiment, it may also be possible to design a configuration in which all of the processing to control the continuous calibration, to be explained below, is performed within the image forming apparatus, or to design a configuration in which part of the processing is performed by an information processing device, such as a PC, connected via a network, such as a LAN.

Steps 1201 to 1211 are the same as steps 801 to 811 in the flow chart in FIG. 8 of the first embodiment, and therefore, explanation is omitted.

At step 1212, the CPU 103 refers to the list before the update at step 1206 by reading the list again from the storage unit 121 etc., and then determines whether the continuous calibration is completed. In the case where the continuous calibration is completed (execution of all the calibrations included in the list before the update is ended), the CPU 103 ends the present processing. On the other hand, in the case where the continuous calibration is not completed yet, the procedure proceeds to step 1213.

At step 1213, the CPU 103 does a job of interrupt printing related to a request for printing after bringing the continuous calibration function into the temporarily suspended state.

At step 1214, the CPU 103 determines whether all of the jobs of interrupt printing are done. In the case where there is a job of interrupt printing not done yet, the procedure returns to step 1213 and the next job of interrupt printing is done. On the other hand, in the case where there is not a job of interrupt printing not done yet, the procedure proceeds to step 1215.

At step 1215, the CPU 103 returns one or a plurality of calibrations deleted from the list by the update at step 1206 to the list and deletes one or a plurality of calibrations already executed at step 1203 from the list. For example, in the case where the single color calibrations for copy and error diffusion are deleted from the list in the initial state in FIG. 7A at step 1206, as described previously, the list is in the state shown in FIG. 7B, and therefore, the CPU 103 restores the deleted calibrations and deletes the maximum density correction, the single color calibrations for low line number and for high line number, and the multi color calibration already executed at step 1203 from the list. Due to this, only the remaining calibrations that are cancelled are restored to the list.

At step 1216, the CPU 103 refers to the restored list and sets the smallest value of the numbers N of the calibrations returned to the list by restoration (cancelled calibrations) as the counter value X. In the example described above, the single color calibrations for copy with N=2 and for error diffusion with N=3 are restored, and therefore, 2 is set to the count value X. After the counter value X is set, the procedure returns to step 1203. Due to this, the calibrations are executed in accordance with the newly set count value X and the continuous calibration is resumed from the temporarily suspended state. Then, in the stage where it is determined that the execution of all the calibrations within the restored list is completed (Yes at step 1211), the present processing is ended.

As explained above, according to the present embodiment, after temporarily suspending the continuous calibration to perform interrupt printing, the execution of the cancelled calibration is resumed, and therefore, it is made possible to execute the continuous calibration completely.

Third Embodiment

In the second embodiment, the aspect is explained in which the continuous calibration is executed completely by resuming the execution of the cancelled calibrations after the interrupt printing ends. However, in the case where there is a possibility that the density or environment changes before and after the suspension of the continuous calibration (before and after interrupt printing), it is sometimes desirable to execute the continuous calibration from the beginning again rather than resuming only the cancelled calibrations of the suspended continuous calibration.

Because of this, an aspect is explained as a third embodiment, in which whether to resume the suspended continuous calibration or to execute the continuous calibration from the beginning is determined in view of predetermined conditions, specifically, the elapsed time, the change in environment, and the number of output sheets. Explanation of portions common to those of the second embodiment is omitted, and in the following, different points are explained mainly.

Figure 13B:
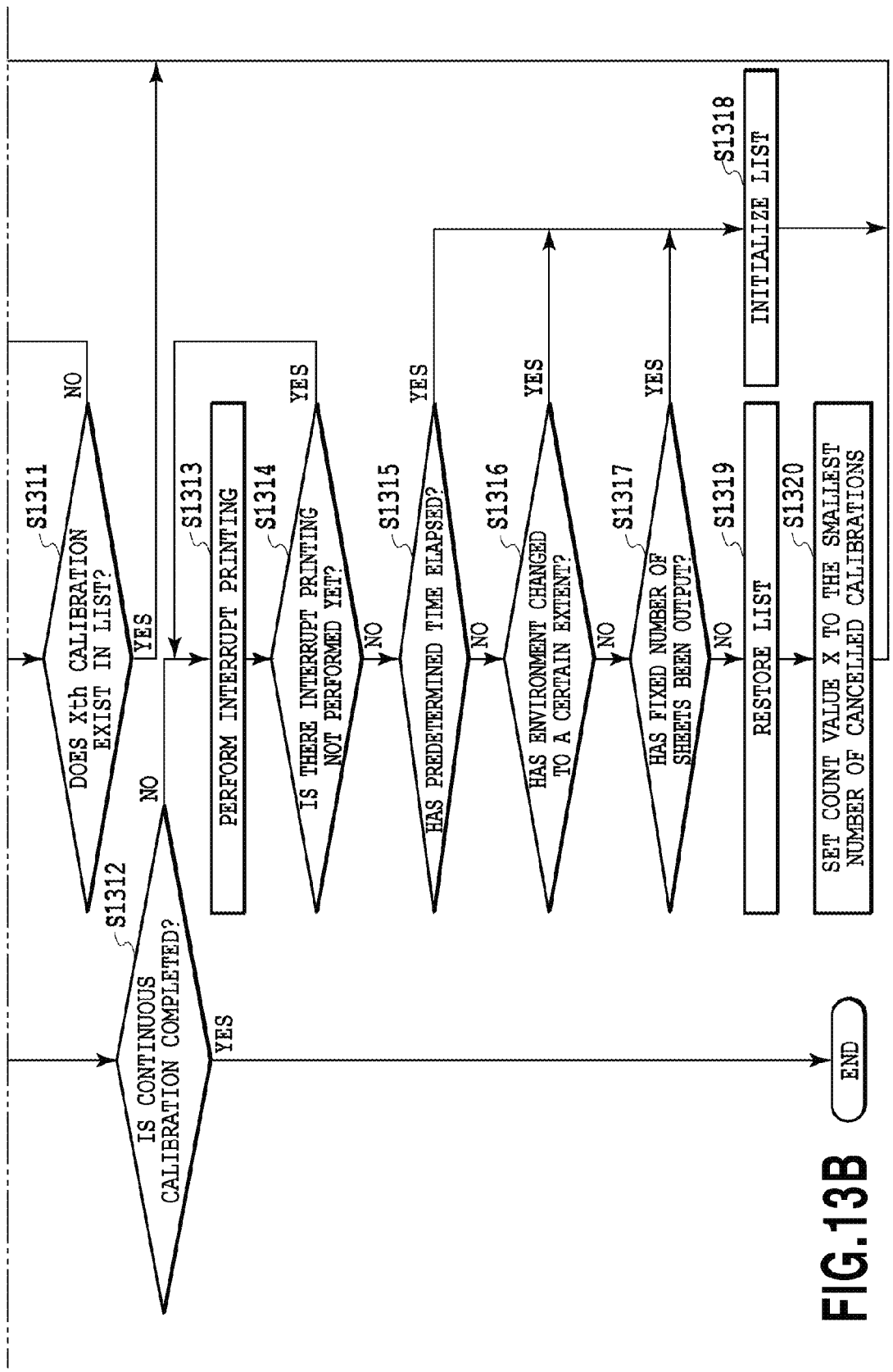

FIG. 13 is a flowchart showing a flow of processing to resume the suspended continuous calibration or to execute the continuous calibration again in view of predetermined conditions after interrupt printing ends. The series of processing is implemented by the CPU 103 executing a computer-executable program in which the procedure shown below is described after reading the program on the RAM, not shown.

As in the first and second embodiments, it may also be possible to design a configuration in which all of the processing to control the continuous calibration, to be explained below, is performed within the image forming apparatus, or to design a configuration in which part of the processing is performed by an information processing device, such as a PC, connected via a network, such as a LAN.

Steps 1301 to 1314 are the same as steps 1201 to 1214 in the flowchart in FIG. 12 of the second embodiment, and therefore, explanation is omitted.

At step 1315, the CPU 103 reads history information from the storage unit 121, calculates the elapsed time from the current date and the date of registration included in the history information, and determines whether a predetermined time set in advance has elapsed.

Here, history information is explained. FIG. 14 is a diagram showing an example of history information stored in the storage unit 121. In FIG. 14, "Date of registration" indicates the date of execution of the continuous calibration, "Environment" indicates the environment in which the image forming apparatus is placed at the time of execution of the continuous calibration, and "Number of output sheets" indicates the total number of sheets (count value) printed before the execution of the continuous calibration. In this case, "Environment" includes two kinds of information, that is, in-apparatus temperature and in-apparatus humidity. Here, the in-apparatus temperature is classified into three levels, that is, high temperature in the case where the in-apparatus temperature is 28 degrees or higher, standard temperature where less than 28 degrees and not less than 10 degrees, and low temperature where less that 10 degrees, and the in-apparatus humidity is classified into three levels, that is, high humidity in the case where the in-apparatus humidity is 80% or higher, standard humidity where less than 80% and not less than 40%, and low humidity where less than 40%. As a result of this, the combination of the in-apparatus temperature and the in-apparatus humidity is classified into nine kinds as follows.

High temperature/high humidity
High temperature/standard humidity
High temperature/low humidity
Standard temperature/high humidity
Standard temperature/standard humidity
Standard temperature/low humidity
Low temperature/high humidity
Low temperature/standard humidity
Low temperature/low humidity Then, at the time of execution of the single color calibration, the temperature and humidity are measured by a temperature sensor and a humidity sensor, respectively, located inside the image forming apparatus and one of the nine kinds of combinations described above is stored in the box of "Environment" in accordance with the results of measurement.

Explanation is returned to the flowchart in FIG. 13.

The CPU 103 refers to the above-described history information and determines whether a predetermined time set in advance (e.g., 24 hours) has elapsed from the time of execution of the continuous calibration at the previous time. In the case where it is determined that the predetermined time has elapsed, the procedure proceeds to step 1318. On the other hand, in the case where it is determined that the predetermined time has not elapsed yet, the procedure proceeds to step 1316.

At step 1316, the CPU 103 measures the temperature and humidity with the temperature sensor and the humidity sensor located inside the image forming apparatus, refers to the history information, and determines whether the environment has changed from the time of execution of the continuous calibration at the previous time. For example, in the case where "Standard temperature/standard humidity" is stored in "Environment" of the history information, it is assumed that the results of measurement are that the in-apparatus temperature is 20 degrees and the in-apparatus humidity is 30%. In this case, it is determined that the environment has changed from "Standard temperature/standard humidity" to "Standard temperature/low humidity". In the case where it is determined that the environment has changed from the time of use of the continuous calibration function at the previous time as described above, the procedure proceeds to step 1318. On the other hand, in the case where it is determined that the environment has not changed from the time of use of the continuous calibration function at the previous time, the procedure proceeds to step 1317.

At step 1317, the CPU 103 refers to the history information, calculates a difference between the count value in "Number of output sheets" and the current count value (number of output sheets from the time of execution of the continuous calibration at the previous time), and determines whether a predetermined number of sheets set in advance is output. In the case where it is determined that the predetermined number of sheets set in advance is output, the procedure proceeds to step 1318. On the other hand, in the case where it is determined that the predetermined number of sheets set in advance is not output yet, the procedure proceeds to step 1419.

At step 1318, the CPU 103 initializes the list. Specifically, for example, the CPU 103 returns the list from the state in FIG. 7B described previously to the state in FIG. 7A. Due to this, a state is brought about where all the kinds of calibrations (N=1 to 6) included in the continuous calibration are executed.

At step 1319, the CPU 103 returns one or a plurality of calibrations deleted by the update of the list at step 1306 to the list and deletes one or a plurality of calibrations already performed at step 1303 from the list. This is the same as that at step 1215 in the flowchart in FIG. 12 in the second embodiment.

At step 1320, the CPU 103 refers to the restored list and sets the smallest value of the numbers N of the calibrations returned to the list by restoration (calibrations that are cancelled and not executed yet) as the count value X. This is the same as that at step 1216 in the flowchart in FIG. 13 in the second embodiment. Due to this, the calibrations in accordance with the newly set count value X are executed and the continuous calibration is resumed from the temporarily suspended state.

The, in the stage where it is determined that execution of all the calibrations within the restored list is ended (Yes at step 1312), the present processing is ended.

As explained above, according to the present embodiment, in the case where the density or environment has changed before and after the suspension of the continuous calibration, the continuous calibration is executed from the beginning. Due to this, it is made possible to maintain accuracy of calibration.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-089773, filed Apr. 22, 2013, which is hereby incorporated by reference herein in its entirety.

What is claimed is:

1. A device for controlling an image forming apparatus having a function to execute a first calibration and a second calibration different from the first calibration, the device comprising:
   an execution instruction unit configured to give instructions to continuously execute the first calibration and the second calibration; and
   an abort instruction unit configured to give instructions, after the execution instruction unit has given instructions for continuous execution of the first calibration and the second calibration, to abort execution of the second calibration which is yet to be executed in response to the instructions for continuous execution given by the execution instruction unit during execution of the first calibration,
   wherein,
   the first calibration is a single color calibration to correct a single color,
   the second calibration is a multi-color calibration to correct a multi-color,
   the single color calibration, which is the first calibration, further includes a calibration for low line number to correct an output characteristic in a case where an image with a low number of lines is output, and
   the abort instruction unit is further configured to give instructions to abort execution of the first calibration in a case where the abort instruction unit gives instructions to abort execution of the calibration for low line number, and the abort instruction unit also gives instructions to abort execution of the multi-color calibration, which is the second calibration,
   wherein a processor and a memory implement at least one of the execution instruction unit and the abort instruction unit.

2. The device according to claim 1, further comprising a user interface for a user to specify a calibration which is to be aborted,
   wherein the abort instruction unit gives instructions to abort execution of the second calibration which is not yet executed in accordance with the instructions from the user via the user interface.

3. The device according to claim 1, wherein
   the first calibration and the second calibration executed continuously are managed by a list, and
   the device further comprises a list update unit configured to delete the second calibration for which instructions to abort execution are given in the case where the abort instruction unit has given the instructions to abort execution.

4. The device according to claim 3, wherein, at the time of deleting the second calibration for which instructions to abort execution are given from the list, the list update unit also deletes a third calibration that is executed using a result of the second calibration for which the instructions to abort execution are given from the list.

5. The device according to claim 4, wherein,
   the first calibration includes a calibration to correct maximum density,
   the abort instruction is further configured to give instructions to abort execution of the calibration to correct the maximum density included in the first calibration, and
   the abort instruction unit also gives instructions to abort execution of the second calibration.

6. The device according to claim 4, further comprising a unit configured to, in a case where the list update unit deletes the third calibration from a list, notify a user of contents of the third calibration.

7. The device according to claim 3, wherein
   in a case where interrupt printing ends, the interrupt printing being performed in the image forming apparatus by accompanying the abort of execution of a calibration, the execution instruction unit gives instructions to execute the calibration for which the abort instruction unit has given instructions to abort execution.

8. The device according to claim 3, further comprising a unit configured to determine, in a case where interrupt printing in the image forming apparatus performed accompanying the abort of execution of a calibration ends, whether or not to execute the continuous calibration of the first calibration and the second calibration from the beginning using the result of comparison between history information before the interrupt printing is performed and history information after the interrupt printing end.

9. The device according to claim 1, further comprising a unit configured to notify a user of information on kinds of jobs associated with each of the first calibration and the second calibration after the execution of each calibration ends.

10. An image forming apparatus having a function to continuously execute the first calibration and the second calibration, wherein
    the image forming apparatus comprises the device according to claim 1.

11. An image forming apparatus having a function to continuously execute the first calibration and the second calibration, wherein
    the image forming apparatus is connected with the device according to claim 1 via a network.

12. A method executed by a device for controlling an image forming apparatus having a function to execute a first calibration and a second calibration different from the first calibration, the method comprising the steps of:
    an execution instruction step of an execution instruction unit giving instructions to continuously execute the first calibration and the second calibration; and
    an abort instruction step of an abort instruction unit giving instructions, after the instructions for continuous execution of the first and second calibrations is given in the execution instruction step, to abort execution of the second calibration which is yet to be executed in response to the instructions for continuous execution given at the execution instruction step during execution of the first calibration, wherein, the first calibration is a single color calibration to correct a single color, the second calibration is a multi-color calibration to correct a multi-color, the single color calibration, which is the first calibration, further includes a calibration for low line number to correct the output characteristic in a case where an image with a low number of lines is output, and the abort instruction step further gives instructions to abort execution of the first calibration in a case where instructions to abort execution of the calibration for low line number is given in the abort instruction step, and gives instructions to abort execution of the multi-color calibration, which is the second calibration.

13. A non-transitory computer readable storage medium storing a program for causing a computer to perform a method executed by a device for controlling an image forming apparatus having a function to execute a first calibration and a second calibration different from the first calibration, the method comprising the steps of:

an execution instruction step of an execution instruction unit giving instructions to continuously execute the first calibration and the second calibration; and an abort instruction step of an abort instruction unit giving instructions, after the instructions for continuous execution of the first and second calibrations is given in the execution instruction step, to abort execution of the second calibration which is yet to be executed in response to the instructions for continuous execution given at the execution instruction step during execution of the first calibration; and wherein the first calibration is a single color calibration to correct a single color, the second calibration is a multi-color calibration to correct a multi-color, the single color calibration, which is the first calibration, further includes a calibration for low line number to correct the output characteristic in a case where an image with a low number of lines is output, and in a case where instructions to abort execution of the calibration for low line number is given in the abort instruction step, instructions to abort execution of the multi-color calibration, which is the second calibration is also given in the abort instruction step.

14. A device for controlling an image forming apparatus comprising:

an image forming unit configured to form an image in accordance with image data;

a control unit configured to control execution of a single color calibration which generates data to be used for correcting the image data in a single color corresponding to a plurality of types of halftone used in forming the image with the image forming unit, and execution of a multi-color calibration which generates data to be used for correcting the image data in a multi-color;

an execution instruction unit configured to instruct execution of the multi-color calibration after execution of the single color calibration; and an abort instruction unit configured to instruct an abort of execution of the multi-color calibration even after receipt of the instruction from the execution instruction unit, in a case where abort of execution of the single color calibration for low line number dither among the plurality of types of halftone is instructed.

15. A method for controlling an image forming apparatus having an image forming unit configured to form an image in accordance with image data, comprising the steps of:

controlling execution of a single color calibration which generates data to be used for correcting the image data in a single color corresponding to a plurality of types of halftone used in forming the image with the image forming unit and execution of a multi-color calibration which generates data to be used for correcting the image data in a multi-color;

instructing execution of the multi-color calibration after execution of the single color calibration; and instructing an abort of execution of the multi-color calibration even after receipt of the instruction of the execution, in a case where an abort of execution of the single color calibration for low line number dither among the plurality of types of halftone is instructed.

\* \* \* \* \*